3,076,825
17α-(1'-FLUOROETHYL) AND 17α-(1',1'-DIFLUORO-
ETHYL) ANDROSTANE DERIVATIVES AND
PROCESS THEREFOR
Albert Bowers and Percy George Holton, Mexico City,
Mexico, assignors, by mesne assignments, to Syntex
Corporation, a corporation of Panama
No Drawing. Filed Feb. 14, 1962, Ser. No. 173,134
12 Claims. (Cl. 260—397.4)

The present invention relates to novel cyclopentano-phenanthrene derivatives and to a process for the production thereof.

More particularly the present invention relates to novel 17α-(1'-fluoroethyl) and 17α-(1',1'-difluoroethyl) derivatives of the androstane series.

The novel compounds of the present invention are represented by the following formulas:

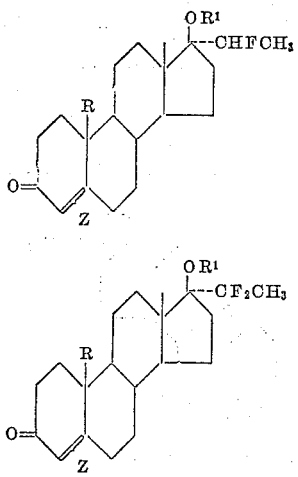

In the above formulas R represents hydrogen or methyl; R¹ represents hydrogen or a hydrocarbon carboxylic acyl group of less than 12 carbon atoms and Z may be a double bond or a saturated linkage between C–4 and C–5.

The compounds represented by the formulas are anabolic-androgenic agents with a favorable anabolic-androgenic ratio. Their particular utility lies in the fact that they are devoid of liver toxicity. Additionally they are anti-estrogenic and anti-progestational compounds with anti-gonadotrophic properties. They lower the blood, serum and liver cholesterol levels and are appetite stimulants. They are in addition useful intermediates in the production of other derivatives of high anabolic activity.

The novel 17α-(1'-fluoroethyl) derivatives of the present invention are prepared by the process represented by the following formula scheme:

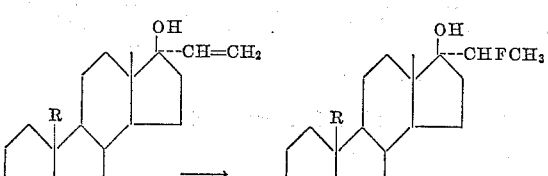

methylene chloride and tetrahydrofuran, using as catalyst boron trifluoride etherate, at a temperature lower than 10° C. for a period of time of the order of 6 hours, thus affording the corresponding 17α-(1'-fluoroethyl) derivative (II).

The 17α-(1',1'-difluoroethyl) derivatives of the present invention are prepared by the process exemplified as follows:

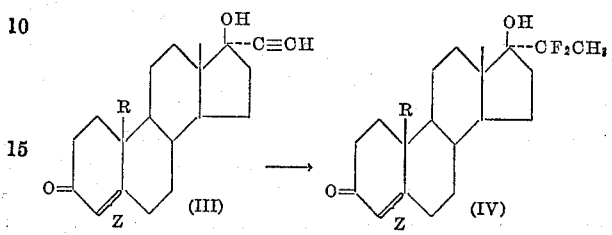

In the above formulas R and Z have the same meaning as previously set forth.

In practicing the process just outlined the starting compound (III) which is a member of the group consisting of 17α-ethynyl testosterone, 17α-ethynyl dihydrotestosterone and the 19-nor derivatives thereof, is treated with hydrogen fluoride, in an inert solvent such as tetrahydrofuran in the presence of boron trifluoride etherate, at a temperature under 10° C. for a period of time of the order of 6 hours, thus yielding the corresponding 17α-(1',1'-difluoroethyl) derivative (IV).

All of the compounds obtained by the above described procedures have a tertiary hydroxyl at the 17β-position and are conventionally acylated in the presence of p-toluenesulfonic acid with an acylating agent such as an anhydride derived from a hydrocarbon carboxylic acid of the previously defined type, thus giving the corresponding 17-acylates.

The following specific examples serve to illustrate, but are not intended to limit the scope of the present invention:

*Example 1*

In a polyethylene flask, adapted with magnetic stirrer, there was dissolved 2.8 g. of 17α-vinyl-testosterone in 30 cc. of methylene chloride, the solution was cooled to 0° C. and a solution of 12 g. of anhydrous hydrogen fluoride in 20 cc. of tetrahydrofurane cooled in a Dry-Ice acetone bath (—70° C.) was added over a period of 20 minutes with constant stirring, then there was further added 1 cc. of freshly distilled boron trifluoride etherate. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 17α-(1'-fluoroethyl)-testosterone. (This compound is a mixture of the optical isomers of the 1'-fluoroethyl group.)

Example IV

17α-ethinyl-dihydrotestosterone was fluorinated by the procedure described in Example I, thus furnishing 17α-(1',1'-difluoroethyl) dihydrotestosterone.

Example V

17α-vinyl-19-nor-testosterone was treated according to Example I to give 17α(1'-fluoroethyl)-19-nor-testosterone.

Example VI

Upon reaction of 17α-ethinyl-19-nor-testerone with hydrogen fluoride, following the procedure of Example I, there was obtained 17α-(1',1'-difluoroethyl)-19-nor testosterone.

Example VII

When applying the procedure described in Example I, to 17α-vinyl-19-nor-dihydrotestosterone, there was produced 17α-(1'-fluoroethyl)-19-nor-dihydrotestosterone.

Example VIII

17α-ethinyl-19-nor-dihydrotesterone was treated in accordance with Example I, thus furnishing 17α-(1',1'-difluoroethyl)-19-nor-dihydrotestosterone.

Example IX

To a solution of 5 g. of 17α-(1'-fluoroethyl)-testosterone in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced a mixture of the acetate of 17α-(1'-fluoroethyl)-testosterone and the enol acetate thereof. This mixture was treated with 100 cc. of cold 2% methanolic potassium hydroxide. The reaction mixture was kept at 0° C. for one hour and then poured into water and neutralized with dilute hydrochloric acid. Ether extraction and crystallization of the residue yielded pure acetate of 17α-(1'-fluoroethyl)-testosterone.

When applying the above technique to the starting compounds under I there were obtained the corresponding products II;

| I | II |
|---|---|
| 17α-(1',1'-difluoroethyl)-testosterone. | The acetate of 17α-(1',1'-difluoroethyl)-testosterone. |
| 17α-(1'-fluoroethyl)-dihydrotestosterone. | The acetate of 17α-(1'-fluoroethyl)-dihydrotestosterone. |
| 17α-(1',1'-difluoroethyl)-dihydrotestosterone. | The acetate of 17α-(1',1'-difluoroethyl)-dihydrotestosterone. |
| 17α-(1'-fluoroethyl)-19-nor-testosterone. | The acetate of 17α-(1'-fluoroethyl)-19-nor-testosterone. |
| 17α-(1',1'-difluoroethyl)-19-nor-testosterone. | The acetate of 17α-(1',1'-difluoroethyl)-19-nor-testosterone. |
| 17α-(1'-fluoroethyl)-19-nor-dihydrotestosterone. | The acetate of 17α-(1'-fluoroethyl)-19-nor-dihydrotestosterone. |
| 17α-(1',1'-difluoroethyl)-19-nor-dihydrotestosterone. | The acetate of 17α-(1',1'-difluoroethyl)-19-nor-dihydrotestosterone. | example, were treated by the procedure described in said example, with the exception that acetic anhydride was substituted by propionic anhydride, caproic anhydride and cyclopentyl propionic anhydride thus affording respectively the propionates, caproates and cyclopentylpropionates of the said compounds.

We claim:

1. A compound of the following formula:

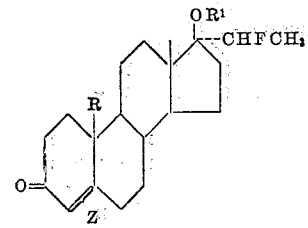

wherein R is a member of the group consisting of hydrogen and methyl; $R^1$ is selected from the group consisting of hydrogen and a hydrocarbon carboxylic acyl group of less than 12 carbon atoms; and Z is a member of the group consisting of a saturated linkage and a double bond between C-4 and C-5.

2. 17α-(1'-fluoroethyl)-testosterone.
3. 17α-(1'-fluoroethyl)-dihydrotestosterone.
4. 17α-(1'-fluoroethyl)-19-nor-testosterone.
5. 17α-(1'-fluoroethyl)-19-nor-dihydrotestosterone.
6. A compound of the following formula:

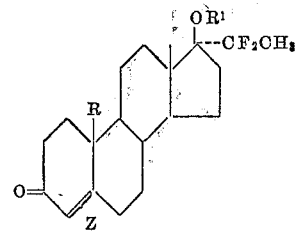

wherein R is a member of the group consisting of hydrogen and methyl; $R^1$ is selected from the group consisting of hydrogen and a hydrocarbon carboxylic acyl group of less than 12 carbon atoms and Z is a member of the group consisting of a saturated linkage and a double bond between C-4 and C-5.

7. 17α-(1',1'-difluoroethyl)-testosterone.
8. 17α-(1',1'-difluoroethyl)-dihydrotestosterone.
9. 17α-(1',1'-difluoroethyl)-19-nor-testosterone.
10. 17α-(1',1'-difluoroethyl) - 19 - nor - dihydrotestosterone.

11. A process for the production of 17α-(1'-fluoroethyl)-androstan-17β-ol derivatives which comprises treating the corresponding 17α-vinyl-androstan-17β-ol compound with hydrogen fluoride in an inert solvent and in the presence of boron trifluoride etherate.

12. A process for the production of 17α-(1',1'-difluoroethyl)-androstan-17β-ol derivatives which comprises treating the corresponding 17α-ethynyl-androstan-17β-ol compound with hydrogen fluoride in an inert solvent and in the presence of boron trifluoride etherate.